US012117980B1

United States Patent
Chacko et al.

(10) Patent No.: US 12,117,980 B1
(45) Date of Patent: Oct. 15, 2024

(54) AUTO RECOGNITION OF BIG DATA COMPUTATION ENGINE FOR OPTIMIZED QUERY RUNS ON CLOUD PLATFORMS

(71) Applicant: Oracle International Corporation, Redwood Shores, CA (US)

(72) Inventors: Sujith Chacko, Bangalore (IN); Rachit Arora, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 18/244,461

(22) Filed: Sep. 11, 2023

(51) Int. Cl.
- *G06F 16/00* (2019.01)
- *G06F 11/34* (2006.01)
- *G06F 16/21* (2019.01)
- *G06F 16/2455* (2019.01)

(52) U.S. Cl.
CPC ........ *G06F 16/217* (2019.01); *G06F 11/3409* (2013.01); *G06F 16/2455* (2019.01)

(58) Field of Classification Search
CPC .......................... G06F 16/217; G06F 16/2455
See application file for complete search history.

(56) References Cited

U.S. PATENT DOCUMENTS

| | | | |
|---|---|---|---|
| 10,430,440 B2* | 10/2019 | Llaves | G06N 5/04 |
| 10,592,507 B2 | 3/2020 | Kalakanti et al. | |
| 10,805,316 B2* | 10/2020 | Aditham | G06F 21/566 |
| 10,878,341 B2* | 12/2020 | Sadoddin | G16B 50/00 |
| 11,100,106 B1* | 8/2021 | Sainanee | G06F 16/2453 |
| 11,397,734 B2 | 7/2022 | Ma et al. | |
| 11,449,682 B2* | 9/2022 | Galitsky | G06N 5/01 |
| 11,860,869 B1* | 1/2024 | Hwang | G06F 16/24549 |

(Continued)

FOREIGN PATENT DOCUMENTS

| | | |
|---|---|---|
| CN | 109446395 A | 3/2019 |
| CN | 112860736 A | 5/2021 |
| CN | 114357276 A | 4/2022 |

OTHER PUBLICATIONS

"Architecture—Apache Drill", Available online at: https://drill.apache.org/architecture/#:~:text=Apache%20Drill%20is%20a%20low,that%20BI%2FAnalytics%20environments%20require, Accessed from Internet on Jun. 16, 2023, pp. 1-7.

(Continued)

*Primary Examiner* — Noosha Arjomandi
(74) *Attorney, Agent, or Firm* — Kilpatrick Townsend & Stockton LLP

(57) ABSTRACT

A method may include receiving a request for a big data query including characteristics and user parameters and accessing a set of rules based at least in part on respective properties of one or more big data query engines, the set of rules correlating the one or more characteristics, the one or more user parameters and the respective properties. The method may include determining a candidate list including a subset of the big data query engines, determined based on the set of rules. Using a machine learning model, the method may include generating respective probability scores for each big data query engine. The method may include selecting and executing the big data query using a particular big data query engine. The method may include identifying a trigger indicating a performance issue with the particular big data query engine and switching the execution to a second big data query engine.

20 Claims, 12 Drawing Sheets

(56) References Cited

U.S. PATENT DOCUMENTS

| | | | | |
|---|---|---|---|---|
| 11,899,670 | B1* | 2/2024 | Bhagat | G06F 16/2455 |
| 11,995,112 | B2* | 5/2024 | Zhang | G06F 16/00 |
| 2005/0044063 | A1* | 2/2005 | Barsness | G06Q 30/0601 |
| 2011/0153662 | A1* | 6/2011 | Stanfill | G06F 16/24532 |
| | | | | 707/774 |
| 2015/0363167 | A1* | 12/2015 | Kaushik | G06F 16/221 |
| | | | | 707/753 |
| 2016/0140180 | A1* | 5/2016 | Park | G06F 16/248 |
| | | | | 707/769 |
| 2018/0349108 | A1* | 12/2018 | Brebner | G06F 9/451 |
| 2019/0026335 | A1* | 1/2019 | Gerweck | G06F 16/2457 |
| 2020/0379963 | A1* | 12/2020 | Lopes | G06F 16/24542 |
| 2020/0394455 | A1* | 12/2020 | Lee | G06N 20/00 |
| 2021/0357406 | A1* | 11/2021 | Potharaju | G06F 16/2471 |
| 2023/0169077 | A1* | 6/2023 | Zhang | G06F 11/3419 |
| | | | | 707/718 |
| 2023/0229659 | A1* | 7/2023 | Beresniewicz | G06F 16/217 |
| | | | | 707/718 |
| 2024/0126761 | A1* | 4/2024 | Tummala | G06F 16/2246 |
| 2024/0143612 | A1* | 5/2024 | Bigdelu | G06F 16/248 |
| 2024/0144141 | A1* | 5/2024 | Cella | G06Q 10/06375 |

OTHER PUBLICATIONS

"Data Lakehouse—Dremio", Available online at: https://www.dremio.com/, Accessed from Internet on Jun. 16, 2023, pp. 1-20.

"Presto Free, Open-Source SQL Query Engine for any Data", Available online at: https://prestodb.io/, Accessed from Internet on Jun. 16, 2023, pp. 1-7.

Giannakouris et al., "MuSQLE: Distributed SQL Query Execution Over Multiple Engine Environments", Available online at: http://www.cslab.ece.ntua.gr/~dtsouma/index_files/musqle_bigdata.pdf, Feb. 6, 2017, 10 pages.

Simitsis et al., "HFMS: Managing the Lifecycle and Complexity of Hybrid Analytic Data Flows", Available online at: https://web.imsi.athenarc.gr/~alkis/publications/icde13-hfms.pdf, Apr. 8, 2013, 12 pages.

Xu et al., "Big Data Analytics Framework for Improved Decision Making", Available online at: http://worldcomp-proceedings.com/proc/p2014/ICM2818.pdf, Jul. 2014, 7 pages.

* cited by examiner

AUTO RECOGNITION OF BIG DATA COMPUTATION ENGINE FOR OPTIMIZED QUERY RUNS ON CLOUD PLATFORMS

BACKGROUND

With the proliferation of big data, more and more users may wish to query big data sets in order to gain valuable insights for their business or other reasons. Data sources to be queried are varied, having different properties, scales etc. Query types may also vary in scope, objective, priority, and other parameters. At the same time, a wide variety of big data query engines may exist, each with their own strengths and weaknesses. Because there are so many variables, choosing an optimal big data query engine may require specialized knowledge, requiring training and experience that can be unavailable to at least some of the users wanting to execute a big data query.

BRIEF SUMMARY

A method may include receiving, by a computing system, a request for a big data query including one or more characteristics and one or more user parameters. The method may include accessing, by the computing system, a set of rules, the set of rules being based at least in part on respective properties of one or more big data query engines, and the set of rules correlating at least one of the one or more characteristics associated with the big data query and the one or more user parameters with the respective properties of the one or more big data query engines. The method may then include determining, by the computing system, a candidate list of big data query engines may include a subset of the one or more big data query engines, the candidate list determined based at least in part on the set of rules. The method may include generating, by the computing system and using a machine learning model, respective probability scores for each big data query engine of candidate list of big data query engines, the respective probability scores representing a likelihood of the big data query being successfully completed by each big data query engine of the subset. The method may include selecting, by the computing system, a particular big data query engine of the one or more big data query engines of the candidate list, based at least in part on the respective probability score of the particular big data query engine. The method may include executing, by the computing system, the big data query using the particular big data query engine. The method may include identifying, by the computing system, a trigger indicating a performance issue with the particular big data query engine. The method may include switching, by the computing system, the execution the big data query to a second big data query engine of the candidate list of big data query engines.

In some embodiments, identifying the trigger indicating a performance issue further may include monitoring, by the computing system, one or more performance metrics of the particular big data query engine during the execution of the big data query. The method may then include determining, by the computing system, that the particular big data query engine is not performing to an expected level based at least in part on the one or more performance metrics and the one or more user parameters. In response to determining that the particular big data query engine is not performing to the expected level, the method may include terminating, by the computing system, the execution of the big data query by the particular big data query engine. The method may then include executing, by the computing system, the big data query using the second data query engine, the second data query engine selected based at least in part on the respective probability score of the second data query engine.

In some embodiments, the method may include determining, by the computing system, one or more performance metrics of the particular big data query engine during the execution of the big data query. The method may include retraining, by the computing system, the machine learning model using the one or more the one or more performance metrics and at least one of the one or more characteristics of the big data query and the one or more user parameters. The machine learning model may be retrained after a specific number of query executions. The one or more user parameters may include at least one of a reliability parameter, a latency parameter, and an accuracy parameter. The one or more characteristics of the big data query may include a number of partitions, a row count, a query-type, and a table size. The machine learning model may be trained using a training data set may include a data set size, a row count, a number of partitions, a column count, a column type map, a number of files, a query-operator count map, a query result reliability weight, a query execution time, and a query execution time weight. In some embodiments, determining the candidate list is based at least in part on a relational tree may include the one or more characteristics associated with the big data query and the one or more user parameters.

A computing system may include one or more processors and a computer readable memory may include instructions that, when executed by the one or more processors, cause the computing system to perform operations. According to the operations, the computing system may receive a request for a big data query may include one or more characteristics and one or more user parameters. The computing system may access a set of rules, the set of rules being based at least in part on respective properties of one or more big data query engines, and the set of rules correlating at least one of the one or more characteristics associated with the big data query and the one or more user parameters with the respective properties of the one or more big data query engines. The computing system may determine a candidate list of big data query engines may include a subset of the one or more big data query engines, the candidate list determined based at least in part on the set of rules. The computing system may generate, using a machine learning model, respective probability scores for each big data query engine of candidate list of big data query engines, the respective probability scores representing a likelihood of the big data query being successfully completed by each big data query engine of the subset. The computing system may select a particular big data query engine of the one or more big data query engines of the candidate list, based at least in part on the respective probability score of the particular big data query engine. The computing system may execute the big data query using the particular big data query engine. The computing system may identify a trigger indicating a performance issue with the particular big data query engine. The computing system may switch the execution the big data query to a second big data query engine of the candidate list of big data query engines.

In some embodiments, the operations may further cause the computing system to monitor one or more performance metrics of the particular big data query engine during the execution of the big data query. The computing system may determine that the particular big data query engine is not performing to an expected level based at least in part on the one or more performance metrics and the one or more user parameters. In response to determining that the particular big data query engine is not performing to the expected level, the computing system may terminate the execution of the big data query by the particular big data query engine. The computing system may execute the big data query using the second data query engine, the second data query engine selected based at least in part on the respective probability score of the second data query engine.

In some embodiments, the computing system may be implemented to select a query engine in a Hadoop environment. The machine learning model may be trained using a training data set may include a data set size, a row count, a number of partitions, a column count, a column type map, a number of files, a query-operator count map, a query result reliability weight, a query execution time, and a query execution time weight. The one or more user parameters may include at least one of a reliability parameter, a latency parameter, and an accuracy parameter. The one or more characteristics of the big data query may include a number of partitions, a row count, a query-type, and a table size.

A non-transitory computer-readable medium may include instructions that, when executed by a processor, cause the processor to perform operations. The operations may include receiving, by a computing system, a request for a big data query may include one or more characteristics and one or more user parameters. The operations may include accessing, by the computing system, a set of rules, the set of rules being based at least in part on respective properties of one or more big data query engines, and the set of rules correlating at least one of the one or more characteristics associated with the big data query and the one or more user parameters with the respective properties of the one or more big data query engines. The operations may then include determining, by the computing system, a candidate list of big data query engines may include a subset of the one or more big data query engines, the candidate list determined based at least in part on the set of rules. The operations may include generating, by the computing system and using a machine learning model, respective probability scores for each big data query engine of candidate list of big data query engines, the respective probability scores representing a likelihood of the big data query being successfully completed by each big data query engine of the subset. The operations may include selecting, by the computing system, a particular big data query engine of the one or more big data query engines of the candidate list, based at least in part on the respective probability score of the particular big data query engine. The operations may include executing, by the computing system, the big data query using the particular big data query engine. The operations may include identifying, by the computing system, a trigger indicating a performance issue with the particular big data query engine. The operations may include switching, by the computing system, the execution the big data query to a second big data query engine of the candidate list of big data query engines.

In some embodiments, identifying the trigger indicating a performance issue further may include monitoring, by the computing system, one or more performance metrics of the particular big data query engine during the execution of the big data query. The operations may then include determining, by the computing system, that the particular big data query engine is not performing to an expected level based at least in part on the one or more performance metrics and the one or more user parameters. In response to determining that the particular big data query engine is not performing to the expected level, the operations may include terminating, by the computing system, the execution of the big data query by the particular big data query engine. The operations may include executing, by the computing system, the big data query using the second data query engine, the second data query engine selected based at least in part on the respective probability score of the second data query engine.

In some embodiments, the operations may include determining, by the computing system, one or more performance metrics of the particular big data query engine during the execution of the big data query. The operations may also include retraining, by the computing system, the machine learning model using the one or more the one or more performance metrics and at least one of the one or more characteristics of the big data query and the one or more user parameters. The machine learning model may be retrained after a specific number of query executions. The one or more user parameters may include at least one of a reliability parameter, a latency parameter, and an accuracy parameter. The one or more characteristics of the big data query may include a number of partitions, a row count, a query-type, and a table size.

DETAILED DESCRIPTION

Figure 1:
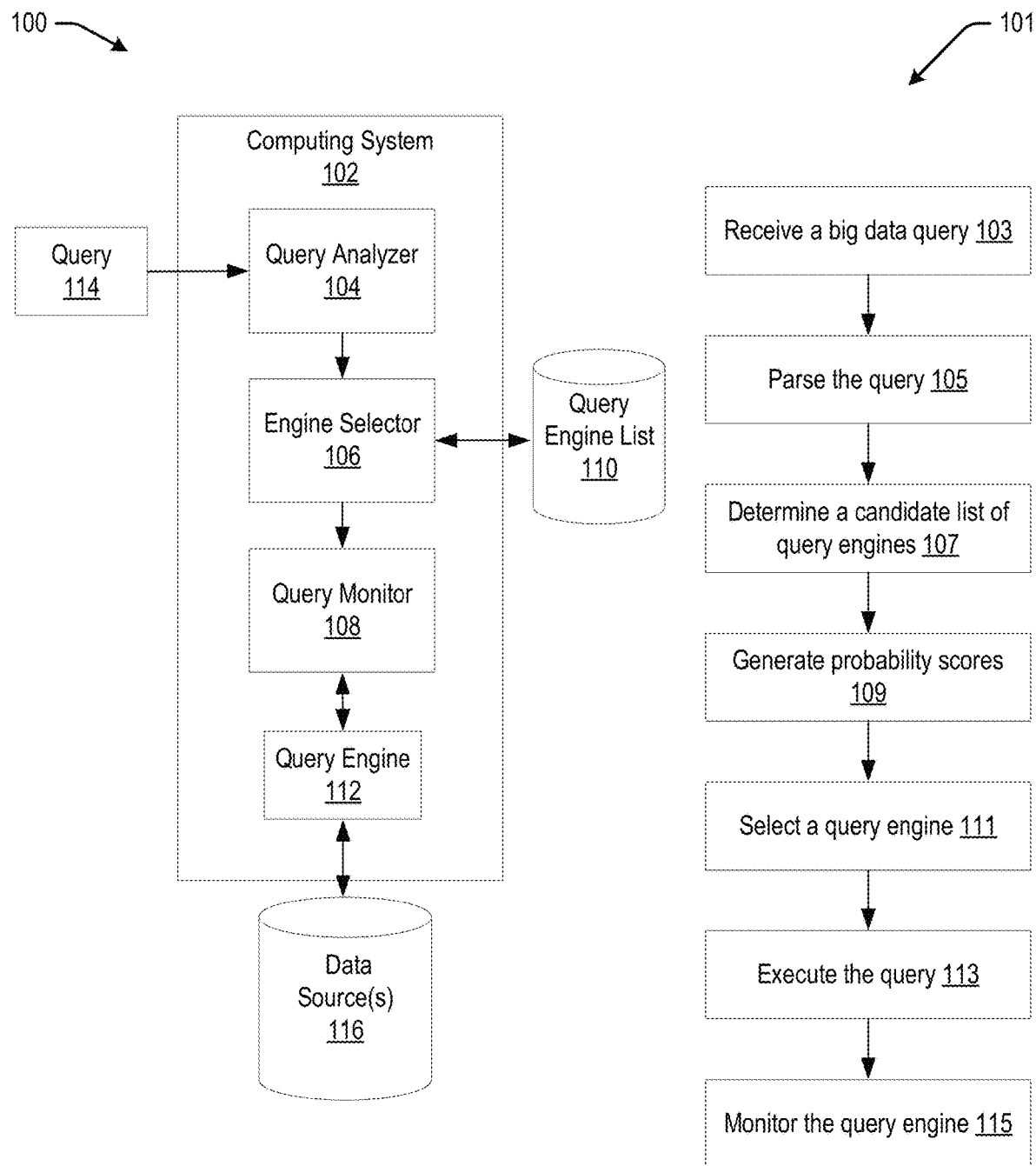
FIG. 1 illustrates a system and a process for automatically selecting a big data query engine and executing a query, according to certain embodiments.

Big data queries may provide a user with valuable insights by accessing and aggregating large data sets from a variety of sources. A query may be directed towards one or more data sources, such as a software-defined file system (SDFS), an object storage, a database, and/or other suitable data storage formats and/or locations. Furthermore, queries may be performed with different goals in mind. Some queries may prioritize a fast response time over accuracy. Other queries may prioritize reliability over latency. Still more queries may prioritize some other attribute. In a big data ecosystem, such as Hadoop, several big data query engines (e.g., Spark, Hive, Trino, Impala, etc.) may be used to query and process the data. The big data query engines may accept a variety of inputs (e.g., a structured query language (SQL) input, then execute the query in a distributed manner. Each of the big data query engines may have various characteristics and capabilities that may enable a particular engine to execute a particular query better than some other query engine. In other words, the priorities associated with a particular query (e.g., latency, response time, etc.) may be better met with a certain big data query engine.

Generally, a user designing the query must decide which query engine to use in order to obtain the results the user needs according to their priorities. While big data service providers may provide big data platforms with several big data query engines installed, the choice of which engine to use is still largely based on the user's knowledge of each query engine, each data source, the interaction between each query engine and each data source, and/or other specialized knowledge. Because of the knowledge required to select the optimal query engine for a particular query, many users may choose an incorrect or less-than-optimal engine for a particular query.

Furthermore, once the user executes the query, the user may not realize that the incorrect query engine was selected until after the results of the query are provided to the user. The user may then re-execute the query, but as before, without the requisite knowledge to choose a query engine better suited to the query, there is no guarantee that the results of the re-executed query will be any better. Therefore, there is a need to develop systems and techniques that are able to filter and select a big data query engine such that even users without specialized knowledge are able to choose an optimal query engine based on the submitted query.

One solution may be to provide a system that may parse a query to determine characteristics associated with the query, then select a query engine based upon the characteristics of the query. For example, a user may generate a query via a user interface or some other appropriate manner. The query may specify one or more data sources to be queried, a query type, and other properties. The user may also provide user parameters representing the user's priorities for the query, such as response time, latency, consistency, amount of data queried, etc. The query may be provided to a query analyzer. The query analyzer may parse the query to identify the characteristics of the query. The query analyzer may also consider the user parameters in parsing the query. The query analyzer may then output data representing the query's characteristics as related to the user parameters.

The data output from the query analyzer may then be provided to an engine selector. The engine selector may include two components: a rules filter (e.g., a static rules filter or a dynamic rules filter) and a machine learning model (MLM). The rules filter may include one or more rules used to associate various characteristics of a query with one or more query engines. For example, if there is a query includes a dataset with a particularly high number of rows and/or partitions, the static rules filter may be used to identify some subset of query engines that perform better with larger numbers of partitions and rows. Another query may be a join query and therefore a second subset of query engines may be identified that perform join queries better than others. The preceding examples may be overly simple for the sake of explanation; an actual query may be much more complex and require filtering based on several rules, characteristics, and user parameters.

After a subset of the query engines is identified using the static rules filter, the subset of query engines may be provided to the MLM. The MLM may be trained to generate a probability score that a particular engine will properly execute a particular query based on the characteristics of the query, the user parameters, and properties of each query engine in the subset of query engines. Thus, the MLM may assign a probability score to each of query engine of the subset of query engines. The engine selector may then utilize the probability scores associated with each of the query engines to select the optimal query engine for the query.

A query monitor may then execute the query using the selected query engine. While the query is being performed, the query monitor may monitor the intermediate results as the intermediate results are received from the query engine. The query monitor may compare the performance of the selected query engine to the user parameters. If the intermediate results are below a threshold such that one or more of the user parameters are not met, the query monitor may terminate the query and re-execute the query using a second query engine. Thus, the query may be properly executed with or without the user's interaction, by an optimal query engine. Because the user may no longer be required to have all of the requisite knowledge to select the optimal query engine, executing a big data query may be performed by more users, leading to greater efficiency. Furthermore, because the query monitor may dynamically switch query engines during the execution of the query, less computing power, energy, and time may be used in case a non-optimal query is selected.

FIG. 1 illustrates a system 100 and a process 101 for automatically selecting a big data query engine and executing a query, according to certain embodiments. The system 100 may include a computing system 102. The computing system 102 may include a query analyzer 104, an engine selector 106, and a query monitor 108. The computing system 102 may be a single computing device (e.g., a physical or virtual machine), or may be implemented in a distributed cloud-based architecture. The computing system 102 may be included in a big data platform, accessed by one or more user of the big data platform. The big data platform may be provided by a cloud services provider and/or big data services provider.

The query analyzer 104 may be configured to parse big data queries. The query analyzer may utilize a rules-based model, neural network (e.g., an attention network) or other suitable model to determine the characteristics of a particular query. The characteristics may include a size of a data set to be queried, a row count, a number of files, a query type (e.g., aggregate, filter, sort, full scan, join, etc.), a data source, and other such characteristics. The query analyzer may also receive a set of user parameters as part of the particular query as a separate input from a user. The user parameters may include reliability, scalability, a cost associated with the query, a response time, accuracy, and the desired response, a reliability of a returned result, and other such parameters. The user may assign a weight to each of the user parameters. For example, the user may consider the reliability of the response more important than the response time of the request. Therefore, the user may assign a weight of 7 to a reliability parameter, and a weight of 3 to a response time parameter. The weight may be assigned to each parameter according to an input on a user interface, such as a slider or other such interface. The weights may be assigned as a number, a percentage, or any other suitable weighting system.

The query analyzer 104 may determine relationships between the characteristics of the query and the user parameters. The query analyzer 104 may then represent the relationships in a relational tree or other such representation. The query analyzer 104 may thereby output data that represents the characteristics of the query and user parameters that may be used to select a query engine.

The engine selector 106 may include a static rules filter and/or an MLM configured to assign a probability score to one or more query engines. The static rules filter may be stored in the computing system 102 or may be external, in a shared storage accessible by other computing systems performing similar operations as the computing system 102. The static rules filter may be used by the engine selector to select a candidate list of query engines from the query engines available to perform the query. For example, the engine selector 106 may access data indicating properties associated with each of the available query engines. The properties may be correlated to at least some of the characteristics of the query. A first query engine may perform better when accessing a particular data source. Another query engine may perform better when executing a certain query type (e.g., a join query). Yet another query engine may perform better when the response time is crucial. One of ordinary skill in the art would recognize many different properties.

The engine selector 106 may then compare the properties of the available query engines to the data output by the query analyzer 104 (e.g., the relational tree) to generate a candidate list of query engines. The engine selector 106 may then assign a probability score to the each of the query engines on the candidate list, representing the likelihood that each query engine could execute the query according to the characteristics of the query and/or the user parameters. To do so, the engine selector 106 may utilize an MLM. The MLM may include an rules-based model, a neural network (e.g., an attention network), or other such models to predict the likelihood of success of any given query engine.

After the engine selector 106 selects a query engine, the query monitor 108 may execute the query using the selected query engine. The query monitor 108 may monitor the performance of the query engine during the execution of the query. The query monitor 108 may be configured to terminate the query in the event of a trigger. The trigger may be based on intermediate results of the query not meeting a user parameter, a user-based trigger, or other such trigger. The query monitor 108 may then re-execute the query using another query engine. In some embodiments, the engine selector 106 may perform operations to select the other query engine. In other embodiments, the query monitor 108 may determine the other query engine based on information already received.

At step 103, the computing system 102 may receive a query 114. The query 114 may be a big data query and include one or more characteristics. The characteristics may include a size of a data set to be queried, a row count, a number of files, a query type (e.g., aggregate, filter, sort, full scan, join, etc.), a data source, and other such characteristics. The query 114 may be generated from a user interface of the computing system 102 or may be received from another user device. The query 114 may also include one or more user parameters, representing a user's preferences associated with the query. In some embodiments, the one or more user parameters may be provided separately though another interface. In either case, the query 114 (including the characteristics and the one or more user parameters) may be provided to the query analyzer 104.

At step 105, the query analyzer 104 may parse the query 114 to determine relationships between the characteristics of the query and the one or more user parameters. The query analyzer 104 may include an MLM, or may be a rules-based model. The query analyzer 104 may also access data indicating properties of data source(s) 116 to be queried. For example, the query 114 may indicate that the data source(s) 116 are to be queried via a particular query type. The query analyzer 104 may then determine properties of the data source(s) 116, such as a row count, a partition count, a data format, and other such properties associated with the data source(s) 116. The properties of the data source(s) 116 may be indicated in the query 114, or may be stored in a separate data store. In either case, the query analyzer 104 may use the characteristics of the query 114 (including the properties of the data source(s) 116) and the one or more parameters to determine a complexity of the query 114. The query analyzer 104 may the generate a relational tree or other such data representing the importance of each of the one or more user parameters and/or the characteristics of the query 114. The query analyzer 104 may then provide the relational tree to the engine selector 106.

At step 107, the engine selector 106 may generate a candidate list of query engines. To do so, the engine selector 106 may access a query engine list 110. The query engine list 110 may include a list of all query engines available to the computing system 102 and/or the user to execute the query 114. The list of all available query engines may include properties of each query engine. For example, a first query engine may perform better than other query engines when processing large data sets. A second query engine may perform more reliably when processing queries of a certain type.

The engine selector 106 may compare the data included in the relational tree provided by the query analyzer 104 to the properties of each of the available query engines using the static rules filter. The static rules filter may include benchmarks for each of the available query engines based on historical queries. For example, a particular engine may perform better under a certain data load, query type, etc. In another example, a certain query type may only be performed by a particular query engine. In other words, the static rules filter may include information that associates one or more query engines with the characteristics and/or user parameters of the query 114. The static rules filter may therefore be used to narrow the number of query engines from the total number of available query engines to a subset of query engines. The subset of query engines may be indicated in a candidate list of query engines.

At step 109, the engine selector 106 may generate probability scores for each query engine on the candidate list. To do so, the candidate list of query engines and/or the relational tree may be provided to an MLM trained to generate a probability score for each query engine. The probability score may represent a likelihood that each query engine would complete the query 114 according to the user parameters. For example, the candidate list may include two query engines. A first query engine may be determined to have a probability score of 80% of completing the query 114 successfully, whereas a second query engine may be determined to have a probability score of 92% of completing the query 114 successfully. The MLM may utilize an attention network or other such model in order to generate the probability scores. Then, at step 111, and based at least in part on the respective probability scores, the engine selector 106 may indicate to the query monitor 108 that a query engine 112 is the optimal query engine to perform the query 114.

At step 113, the query monitor 108 may cause the query 114 to be executed by the query engine 112. To execute the query 114, the query engine 112 may communicate with the data source(s) 116. The query engine 112 may process results as the data source(s) 116 is queries, resulting in intermediate results. In other words, instead of compiling all of the results of the query 114 and generating a response, the query engine 112 may instead process data as it is received.

At step 115, the query monitor 108 may monitor the performance of the query engine 112 during the execution of the query 114. For example, the query monitor 108 may determine that the response time of the query engine 112 is in compliance with the user parameter associated with the query 114. The query monitor 108 may determine that a reliability of the intermediate results, however, are below the corresponding user parameter (e.g., too many error responses, duplicated data, etc.). The query monitor 108 may then determine that the query engine 112 is not performing to the user parameters.

In response, the query monitor 108 may cause the query 114 to be terminated by the query engine 112. Then, the query monitor may re-execute the query 114 using an alternate query engine. In some embodiments, the query monitor 108 may re-execute the query 114 using an alternate query engine previously indicated by the engine selector 106. In other embodiments, the query monitor 108 may provide data indicating the performance of the query engine 112 to the engine selector 106. The engine selector 106 may then perform some or all of the operations described above to select the alternate engine selector. After the query 114 is successfully executed, the results of the query 114 may be processed and returned to the user.

Figure 2:
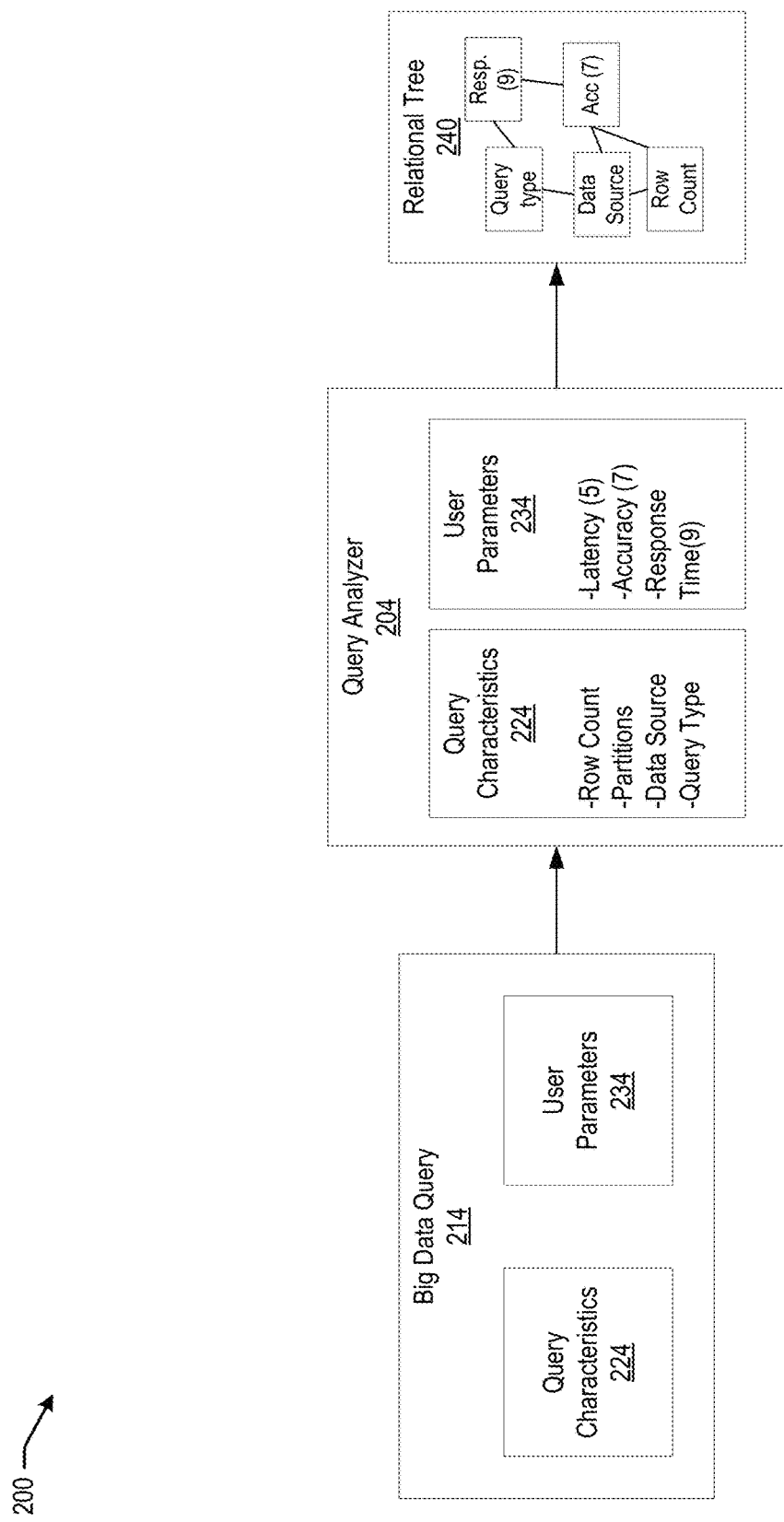
FIG. 2 illustrates a system for generating a relational tree based associated with a big data query, according to certain embodiments.

FIG. 2 illustrates a system 200 for generating a relational tree 240 based associated with a big data query 214, according to certain embodiments. The system 200 may be similar to some or all of the system 100 in FIG. 1. The system 200 may include a query analyzer 204. The query analyzer 204 may be configured to parse a query such as a big data query 214 to determine relationships between characteristics of the query and one or more user parameters.

The big data query 214 may include query characteristics 224 and user parameters 234. The query analyzer 204 may parse the big data query 214 to find relationships between query characteristics 224 and the user parameters 234. Additionally or alternatively, the query analyzer 204 may determine properties of a data source associated with the big data query 214. For example, the data source may include a row count and/or number of partitions. The query analyzer 204 may access a data store including the properties of the data store and/or the properties of the data store may be included in or inferred from the big data query 214.

The query analyzer 204 may also parse the user parameters 234. The user parameters 234 may be included in the big data query 214 or may be provided through a separate interface. Each of the user parameters may include a weight set by a user. For example, as shown in FIG. 2, a user parameter associated with latency may have a weight of 5. A user parameter associated with accuracy may have a weight of 7. A user parameter associated with response time may have a weight of 9. Although not illustrated, the user parameters 234 may include any number of user parameters, such as reliability, format, etc.

Based at least in part on the query characteristics 224 and the user parameters 234, the query analyzer may generate a relational tree 240. The relational tree 240 may include a hierarchical representation of the query characteristics 224 and the user parameters 234. The relational tree 240 may also show how a user parameter is related to a characteristic of the big data query 214. For example, as shown in FIG. 2, the response time parameter may be related to the accuracy parameter and the query type. The query type may be related to the data source. The row count may also be related to the data source. It should be understood that although the only some of the query characteristics 224 and user parameters 234 are shown in the relational tree 240, the relational tree 240 may include any number of query characteristics 224 and user parameters 234. Furthermore, although the relational tree 240 is illustrated as a graphical tree, the relational tree may be any type of logical arrangement of data representing some or all of the query characteristics 224 and/or the user parameters 234.

Figure 3:
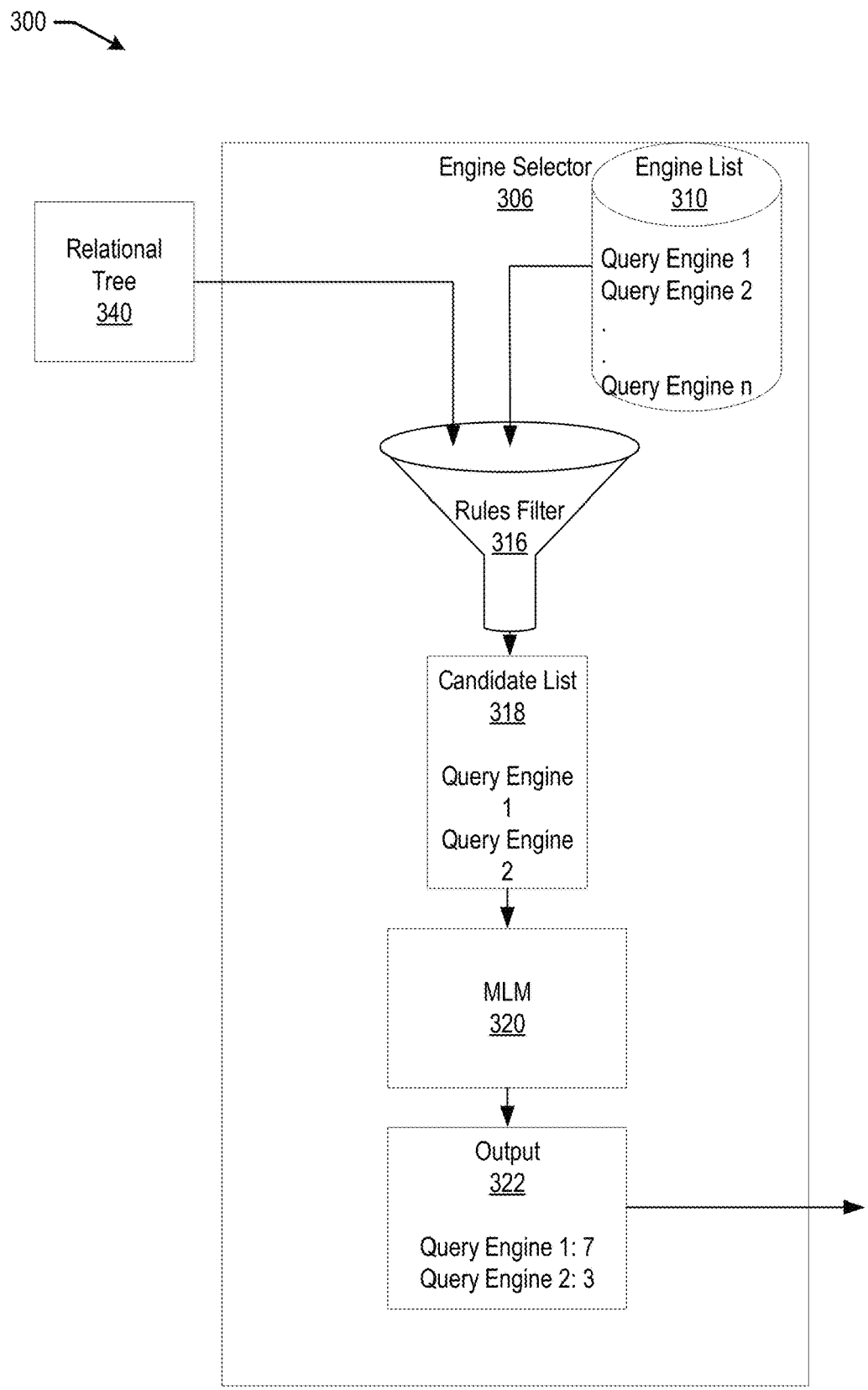
FIG. 3 illustrates a system including an engine selector, according to certain embodiments.

FIG. 3 illustrates a system 300 including an engine selector 306, according to certain embodiments. The system 300 may be included in the system 100 FIG. 1 and/or combined with the system 200 in FIG. 2. The engine selector 306 may include an engine list 310, a rules filter 316 (e.g., for filtering rules, including static rules, dynamic rules, etc.), and an MLM 320. The engine list 310 may include a list of all query engines available to perform a big data query. The engine list 310 may also include properties associated with each of the query engines, such as a cost, response time, and other performance metrics.

The rules filter 316 may include one or more benchmarks determined by historical big data queries executed by some or all of the query engines included in the engine list 310. Thus, the rules filter 316 may indicate how each of the query engines in the engine list 310 performs according to certain queries and/or user parameters. For example, the rules filter 316 may indicate that, based on a certain data load from a particular data source, query engines 1 and 2 tend to perform better than any other query engines included in the engine list 310. The rules filter 316 may also include user rules. For example, a user may have specialized knowledge that a particular query engine is the optimal choice for a certain query type and data source. Therefore, the user may set a rule that any query of the certain query type and data source should be executed by the particular query engine.

The rules filter 316 may be provided with a relational tree 340 associated with a big data query. The relational tree 340 may be similar to the relational tree 240 in FIG. 2, and include query characteristics and user parameters. The rules filter 316 may compare the relational tree 340 and/or the properties of the query engines in the engine list 310 according to the benchmarks and user rules. The rules filter 316 may generate a candidate list 318 including query engines selected according to the benchmarks and/or user rules. For example, as shown in FIG. 3, the candidate list 318 includes the query engine 1 and the query engine 2, selected from query engines 1-n. Thus, instead of analyzing every query engine in the engine list 310, the MLM 320 may only analyze the query engines 1 and 2 included in the candidate list 318, saving time and computing power.

The candidate list 318 may be provided to the MLM 320. The MLM 320 may assign a probability score to each of the query engines indicated on the candidate list 318. The MLM 320 may be trained on historical big data queries using various engines. The MLM 320 may include a neural network (e.g., an attention unit) or other suitable machine learning model. Thus, the MLM 320 may be trained to recognize certain characteristics of queries and associated those characteristics with performance metrics of the query engines in the engine list 310. For example, as shown in FIG. 3, the MLM 320 may determine that the query engine 1 has a probability score of 7 (e.g., out of 10), while the query engine 2 has a probability score of 3. The MLM 320 may then output the probability scores associated with each of the query engines 1 and 2 as output 322.

Figure 4A:
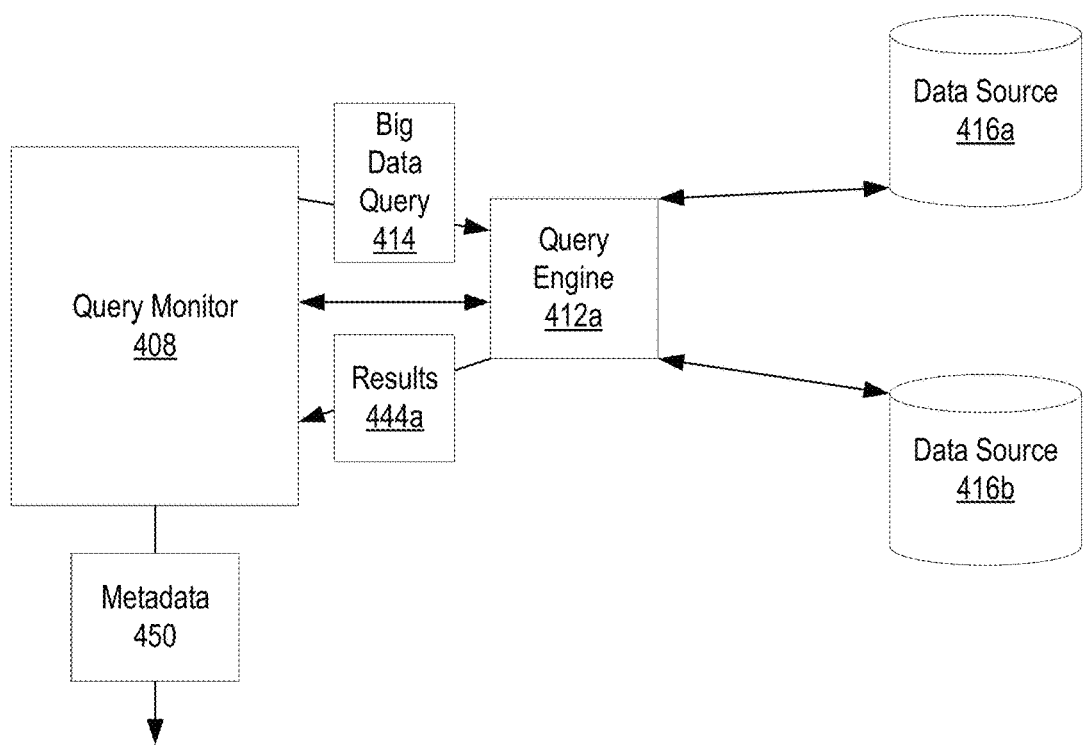
FIG. 4A illustrates a system for executing and monitoring a big data query, according to certain embodiments.

FIG. 4A illustrates a system 400 for executing and monitoring a big data query 414, according to certain embodiments. The system 400 may be included in the system 100 in FIG. 1, and/or be combined with the systems 200 and 300 in FIGS. 2 and 3, respectively. The system 400 may include a query monitor 408 and a query engine 412*a*. The query monitor 408 and the query engine 412*a* may be implemented on a single computing system (e.g., the computing system 102) or may be implemented on different systems. The query monitor 408 may be similar to the query monitor 108 in FIG. 1. Further, the query monitor 408 may receive the output from an engine selector such as the engine selector 306 in FIG. 3. Thus, the query monitor 408 may execute a big data query 414 via the query engine 412*a* based at least in part on a probability score. The probability score may represent that a likelihood that the query engine 412*a* will execute the big data query 414 successfully.

The query engine 412*a* may execute the big data query 414 by accessing one or both of data sources 416*a-b*. As the query engine 412*a* processes the data from the data sources 416*a-b*, the query engine 412*a* may generate results 444*a*. The results 444*a* may be intermediate results, as opposed to the full results at the completion of the big data query 414. During the execution of the big data query 414, the query monitor 408 may monitor the query engine 412*a* for performance metrics such as latency, response time, etc.

The query monitor 408 may also monitor the results 444*a* as they are received from the query engine 412*a*. The query monitor 408 may compare the results 444*a* to user parameters associated with the big data query 414, such as the user parameters 234 in FIG. 2. If the results 444*a* correspond to the user parameters (e.g., an accuracy of the results 444*a* is acceptable as compared to an accuracy parameter), the execution of the big data query 414 may continue. If the results and/or performance metrics are outside of the user parameters, the query monitor 408 may terminate the execution of the big data query 414. In either case the query monitor 408 may then generate metadata 450 associated with the performance metrics and/or the intermediate results. The metadata 450 may be used to retrain an MLM such as the MLM 320 in FIG. 3 and/or used to adjust rules within the rules filter 316.

Figure 4B:
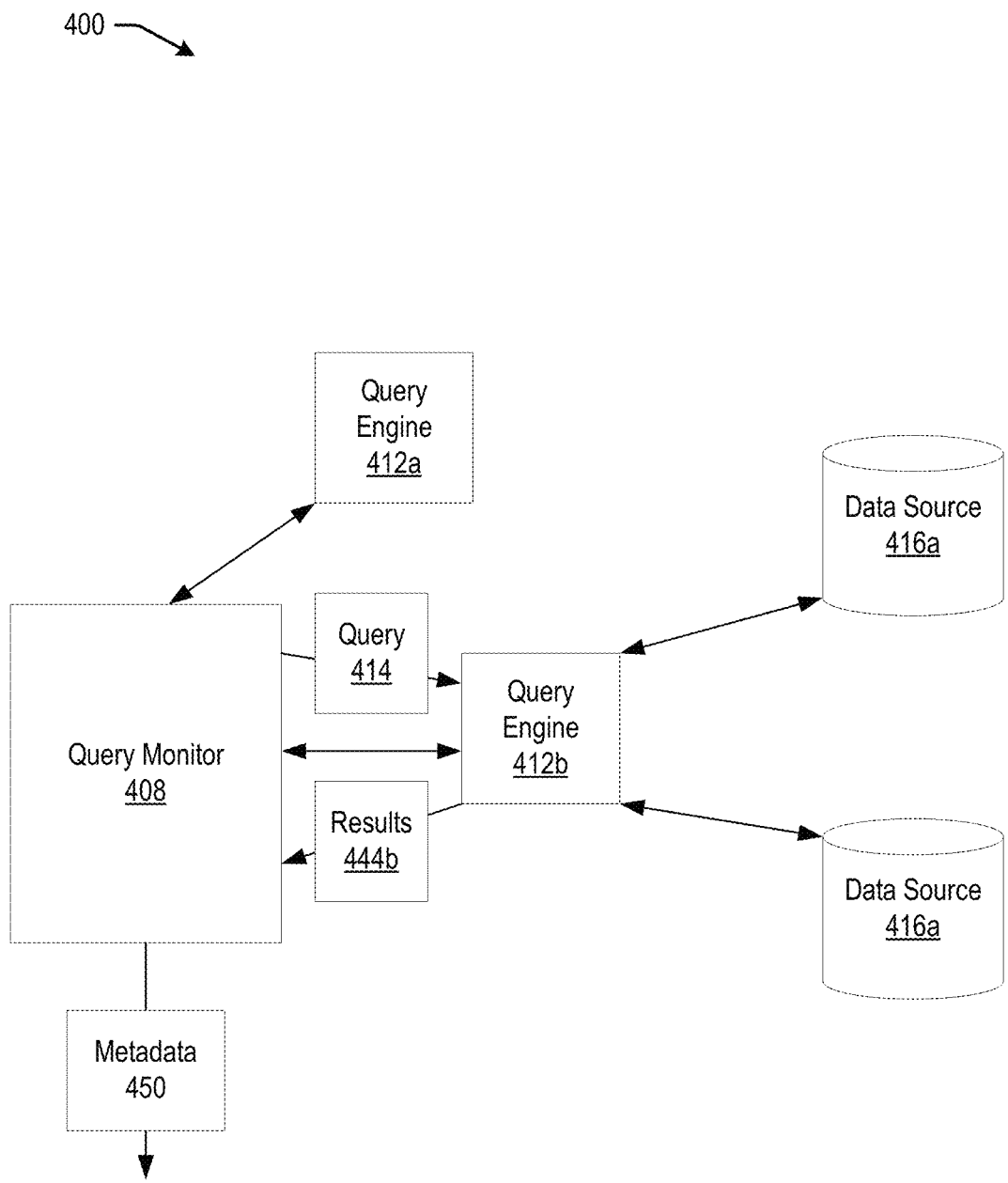
FIG. 4B illustrates a system for dynamically switching big data query engines, according to certain embodiments.

FIG. 4B illustrates a system 400 for dynamically switching big data query engines, according to certain embodiments. After determining that the results 444*a* and/or a performance metric indicated that the query engine 412*a* is not performing the big data query 414 according to the user parameters, the query monitor 408 may terminate the big data query 414. The query monitor 408 may then re-execute the big data query 414 using the query engine 412*b*. The query monitor 408 may re-execute the big data query 414 using the query engine 412*b* based on information previously provided by the engine selector. In some embodiments, the query monitor 408 may provide some or all of the metadata 450 to the engine selector and cause the engine selector to choose a different query engine (e.g., the query engine 412*b*).

In re-executing the big data query 414, the query engine 412*b* may also access and process data from the data sources 416*a-b*. The query engine 412*b* may then provide the query monitor 408 with results 444*b*. The results 444*b* may also be intermediate results. The query monitor 408 may monitor performance metrics of the query engine 412*b* and/or the results 444*b*. The query monitor 408 may then generate the metadata 450 based at least in part on the performance metrics and/or the results 444*b*.

Figure 5:
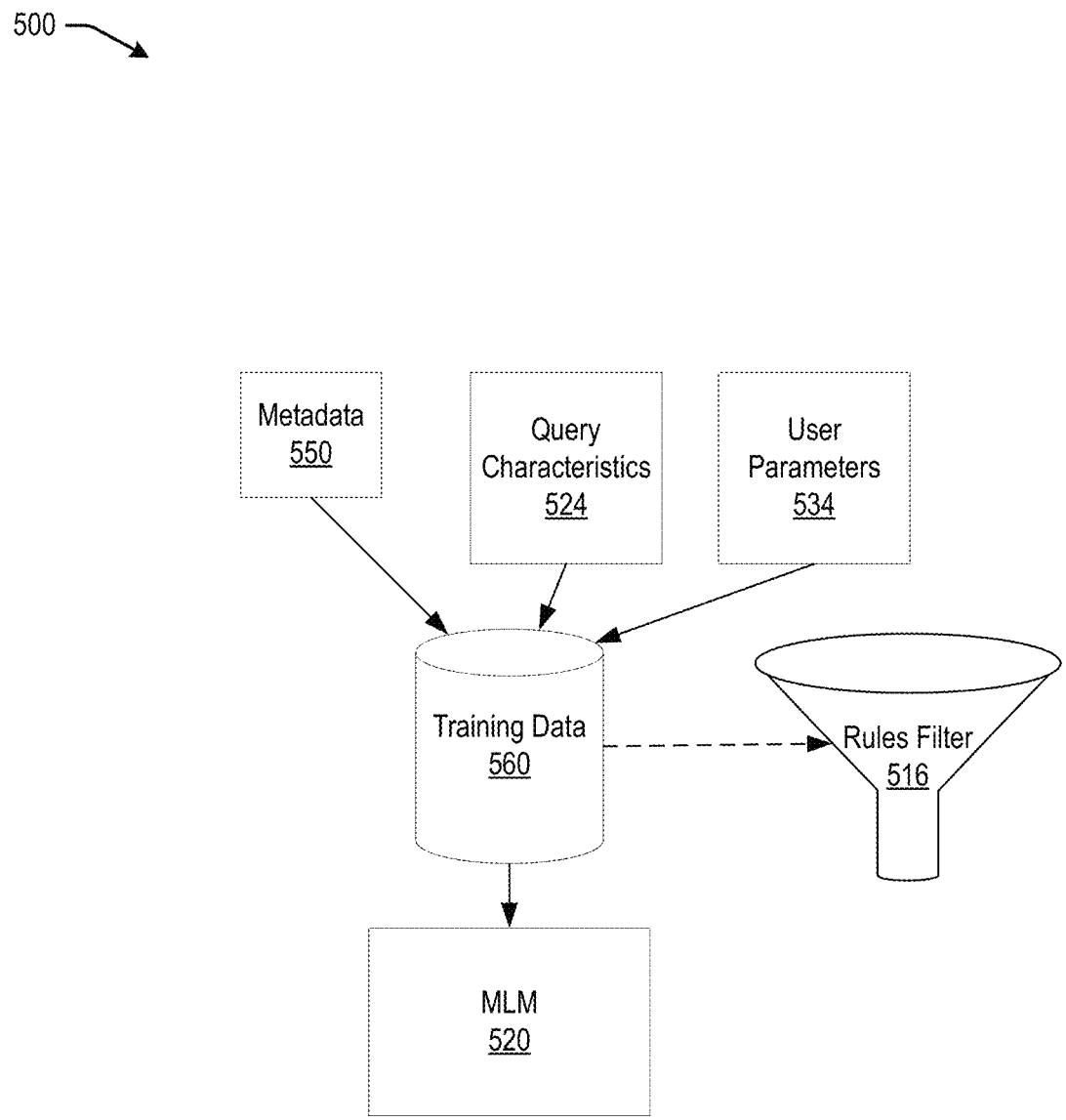
FIG. 5 illustrates a system for retraining a machine learning model, according to certain embodiments.

FIG. 5 illustrate a system 500 for retraining a machine learning model 520, according to certain embodiments. The system 500 may be used with some or all of the system 100 in FIG. 1 and/or the system 300 in FIG. 3. The system 500 may include the MLM 520 and the training data 560. The system 500 may also include a rules filter 516. The training data 560 may include initial training data used to train the MLM 520 to assign probability scores to query engines, based on a likelihood that a query engine can complete a particular query successfully. For example, the training data 560 may include characteristics of a query including a data set size, a row count, a number of partitions, a column count, a column type map, a number of files, a query-operator count map, a query result reliability weight, a query execution time, and a query execution time weight. The initial training data may include historical queries executed by a plurality of query engines, such as the available query engines included in the engine list 310 in FIG. 3. The training data 560 may be updated as a system such the system 100 selects query engines and executes queries. For example, query characteristics 524 and user parameters 534 associated with a query (e.g., the big data query 214 in FIG. 2) may be included in the training data at some point after the query is received and/or executed. Similarly, metadata 550 associated with the query may be provided to the training data 560. Thus, the training data 560 may be continuously updated as queries are performed.

After a number of queries are executed (e.g., 5, 10, 50, etc.), the training data 560 may be provided to the MLM 520 to retrain the MLM 520. Thus, the MLM 520 may become more accurate in the selected query engines as the system executes more queries. Optionally, the rules filter 516 may be updated using at least some of the training data 560. Thus, as applied to the system 100, the system 100 may become more accurate and efficient in selecting and executing big data queries.

Figure 6:
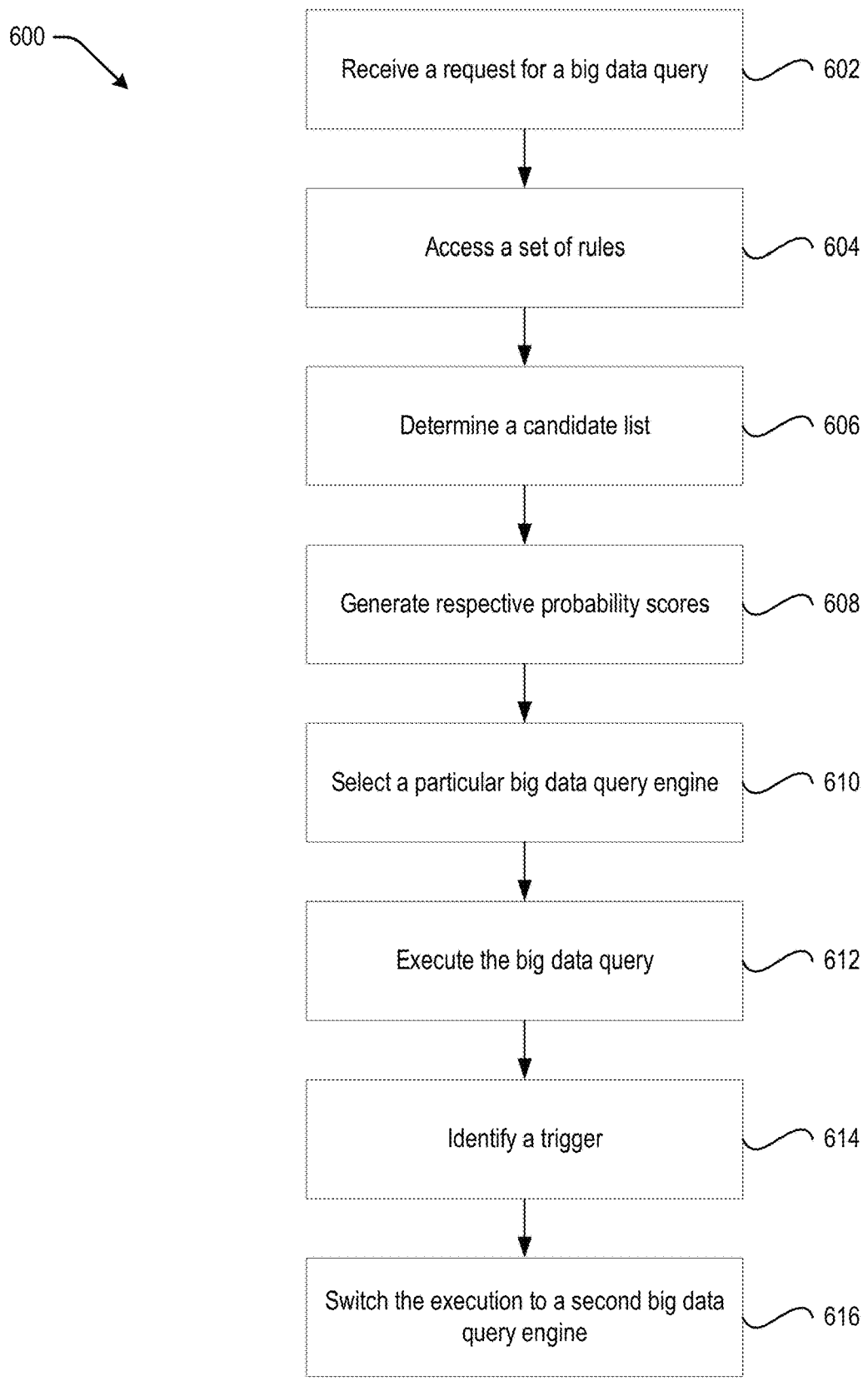
FIG. 6 illustrates a flowchart of a method for selecting a big data query engine, according to certain embodiments.

FIG. 6 illustrates a flowchart of a method 600 for selecting a big data query engine, according to certain embodiments. The method 600 may be performed by any of the systems described herein, such as the system 100 in FIG. 1. The steps of the method 600 may be performed in a different order than that shown and/or combined. Some steps may be skipped altogether.

At step 602, the method 600 may include receiving, by a computing system, a request for a big data query. The request for a big data query may include one or more characteristics associated with the big data query and one or more user parameters. For example, the request may be similar to the big data query 214 in FIG. 2. The one or more characteristics may therefore be similar to the query characteristics 224 and the one or more user parameters may be similar to the user parameters 234. The one or more characteristics may include a number of partitions, a row count, a query-type, a table size, and/or other such characteristics. The one or more user parameters may include a reliability parameter, a latency parameter, an accuracy parameter, and/or other such parameters.

At step 604, the method 600 may include accessing, by the computing system, a set of rules. The set of rules may be based at least in part on respective properties of one or more big data query engines (e.g., the query engines in the engine list 310 in FIG. 3). The set of rules may correlate at least one of the one or more characteristics associated with the big data query and the one or more user parameters with the respective properties of the big data query engines. The set of rules may be based on benchmarking of the big data query engines and/or user-generated rules, similar to the static rules filter in FIG. 3.

At step 606, the method 600 may include determining, by the computing system, a candidate list of the big data query engines. The candidate list may include a subset of the one or more big data query engines, similar to the candidate list 318 in FIG. 3. The candidate list may be determined based at least in part on the set of rules. In some embodiments, the candidate list may be based at least in part on a relational tree. The relational tree may include the one or more characteristics and the one or more user parameters. The relational tree may be generated by a query analyzer such as the query analyzer 204 in FIG. 2. The query analyzer may parse the query request to generate a hierarchical representation of the characteristics and the one or more parameters and the relationships between each.

At step 608, the method 600 may include generating, by the computing system, a respective probability scores for each of the big data query engines included in the candidate list of big data query engines. The respective probability scores may represent a likelihood of each respective big data query engine successfully executing the query. The respective probability scores may be generated by an MLM. The MLM may include and attention module or other such model. The MLM may be initially trained on historical big data queries and/or other characteristics of queries and/or data sources. The other characteristics may include a data set size, a row count, a number of partitions, a column count, a column type map, a number of files, a query-operator count map, a query result reliability weight, a query execution time, a query execution time weight, and other such characteristics.

At step 610, the method 600 may include selecting, by the computing system, a particular big data query engine based at least in part on the respective probability score of the particular big data query engine. For example, the computing system may select the particular big data query engine because it has the highest probability score as compared to the other big data query engines of the candidate list.

At step 612, the method 600 may include executing, by the computing system, the big data query using the particular big data query engine. During the execution of the big data query, the computing system may monitor one or more performance metrics of the particular big data query engine. The computing system may also monitor intermediate results, received by from the big data query engine.

At step 614, the method 600 may include identifying, by the computing system, a trigger indicating a performance issue with the particular big data query engine. For example, a latency performance metric may be outside of a corresponding user parameter. Additionally or alternatively, the intermediate data may be incorrect and/or contain errors beyond what is allowed by the user parameters. In some embodiments, the trigger may be in response to a user input, indicating a change in a user parameter.

At step 616, the method 600 may include switching, by the computing device, the execution of the big data query to a second big data query engine of the candidate list of big data query engines. The second big data query engine may be determined via information already provided by the computing system, or some or all of the steps of the method 600 may be repeated to determine the second big data query engine.

In some embodiments, the identifying the trigger may further include monitoring the one or more performance metrics of the particular big data query engine. The computing system may then determine that the particular big data query engine is not performing to an expected level, based at least in part on the one or more performance metrics and/or the one or more user parameters. In response, the computing system may terminate the execution of the big data query by the particular big data query engine. The computing system may then execute the big data query using the second big data query engine. The second big data query engine may be selected in part on the respective probability score associated with the second big data query engine.

In some embodiments, the method 600 may also include determining, by the computing system one or more performance metrics of the particular big data query engine during the execution of the big data query. The computing system may then retrain the MLM using the performance metrics, the query characteristics, and/or the user parameters. The computing system may retrain the MLM after a certain number of queries are executed.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
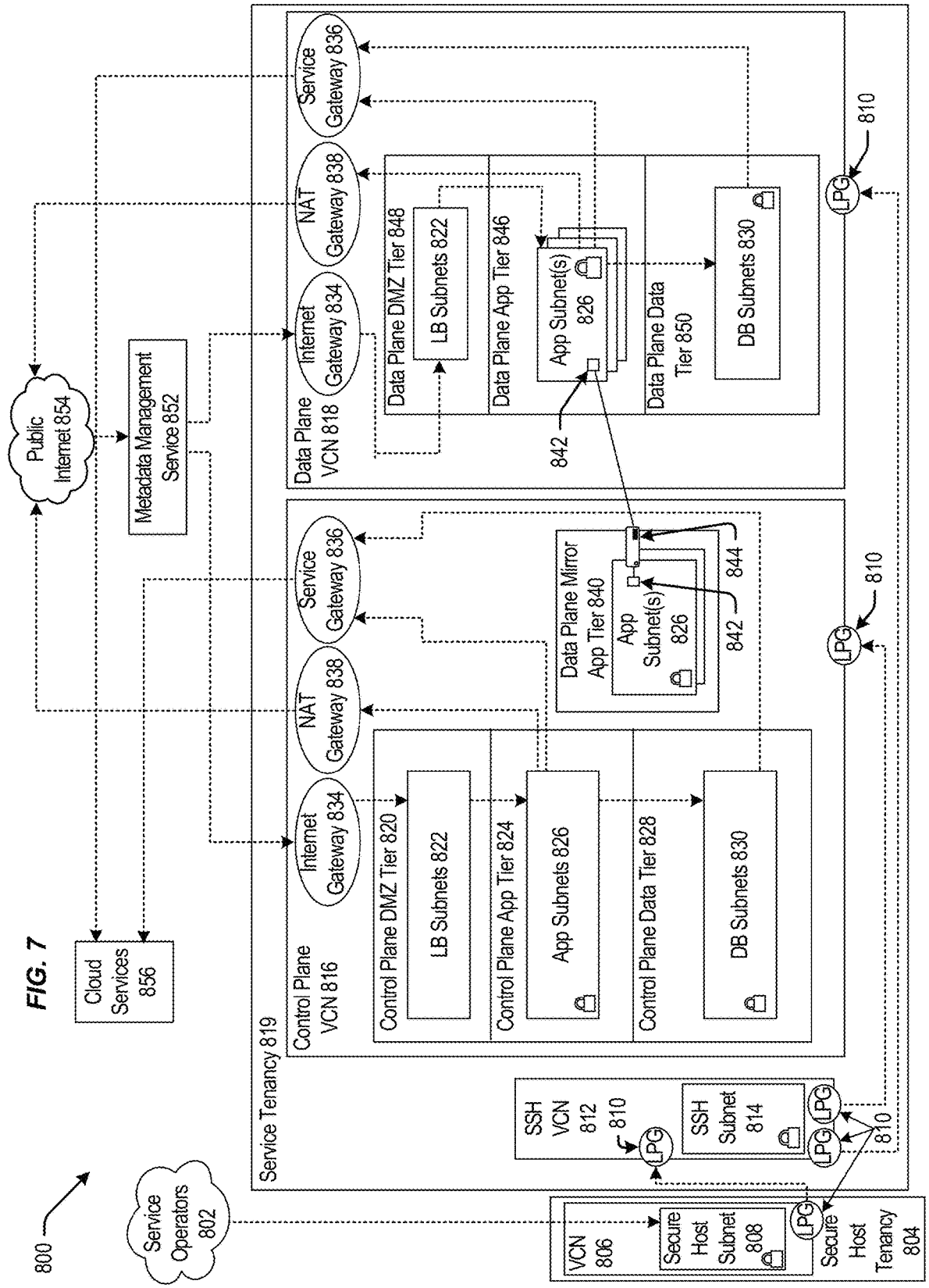
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Metadata that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
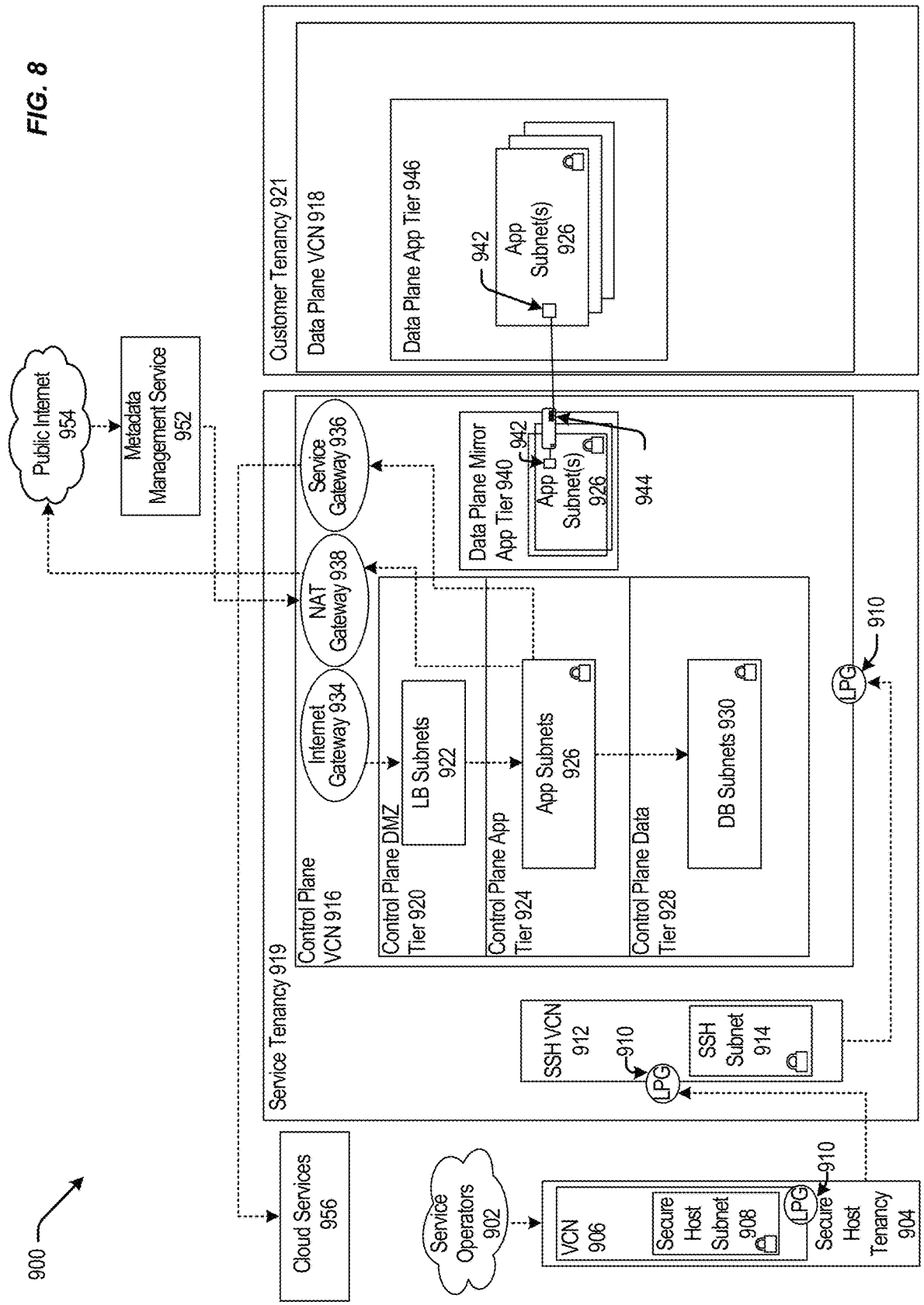
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 702 of FIG. 7) can be communicatively coupled to a secure host tenancy 804 (e.g., the secure host tenancy 704 of FIG. 7) that can include a virtual cloud network (VCN) 806 (e.g., the VCN 706 of FIG. 7) and a secure host subnet 808 (e.g., the secure host subnet 708 of FIG. 7). The VCN 806 can include a local peering gateway (LPG) 810 (e.g., the LPG 710 of FIG. 7) that can be communicatively coupled to a secure shell (SSH) VCN 812 (e.g., the SSH VCN 712 of FIG. 7) via an LPG 710 contained in the SSH VCN 812. The SSH VCN 812 can include an SSH subnet 814 (e.g., the SSH subnet 714 of FIG. 7), and the SSH VCN 812 can be communicatively coupled to a control plane VCN 816 (e.g., the control plane VCN 716 of FIG. 7) via an LPG 810 contained in the control plane VCN 816. The control plane VCN 816 can be contained in a service tenancy 819 (e.g., the service tenancy 719 of FIG. 7), and the data plane VCN 818 (e.g., the data plane VCN 718 of FIG. 7) can be contained in a customer tenancy 821 that may be owned or operated by users, or customers, of the system.

The control plane VCN 816 can include a control plane DMZ tier 820 (e.g., the control plane DMZ tier 720 of FIG. 7) that can include LB subnet(s) 822 (e.g., LB subnet(s) 722 of FIG. 7), a control plane app tier 824 (e.g., the control plane app tier 724 of FIG. 7) that can include app subnet(s) 826 (e.g., app subnet(s) 726 of FIG. 7), a control plane data tier 828 (e.g., the control plane data tier 728 of FIG. 7) that can include database (DB) subnet(s) 830 (e.g., similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g., the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g., the service gateway 736 of FIG. 7) and a network address translation (NAT) gateway 838 (e.g., the NAT gateway 738 of FIG. 7). The control plane VCN 816 can include the service gateway 836 and the NAT gateway 838.

The control plane VCN 816 can include a data plane mirror app tier 840 (e.g., the data plane mirror app tier 740 of FIG. 7) that can include app subnet(s) 826. The app subnet(s) 826 contained in the data plane mirror app tier 840 can include a virtual network interface controller (VNIC) 842 (e.g., the VNIC of 742) that can execute a compute instance 844 (e.g., similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g., the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g., the metadata management service 752 of FIG. 7) that can be communicatively coupled to public Internet 854 (e.g., public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g., cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
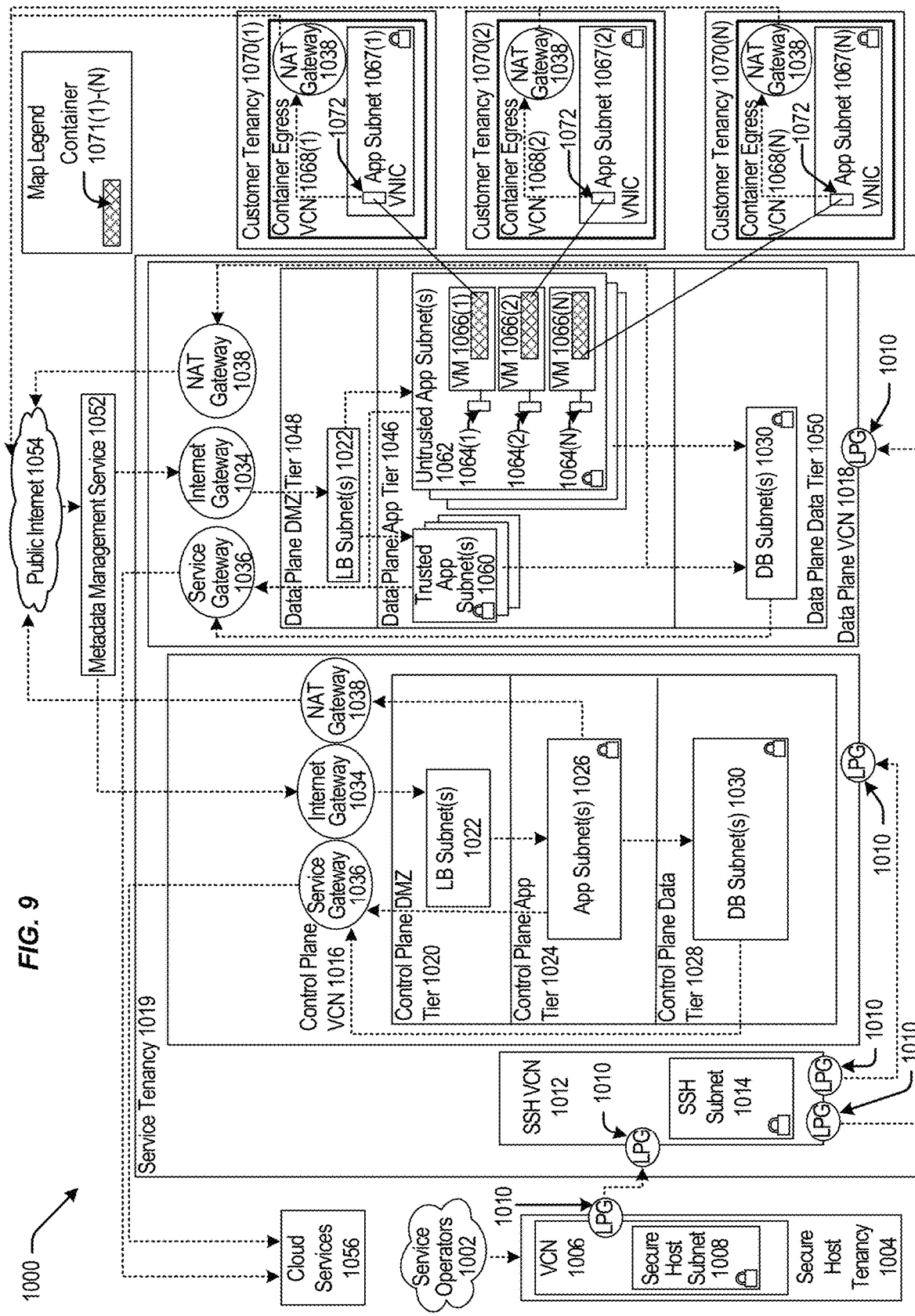
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 702 of FIG. 7) can be communicatively coupled to a secure host tenancy 904 (e.g., the secure host tenancy 704 of FIG. 7) that can include a virtual cloud network (VCN) 906 (e.g., the VCN 706 of FIG. 7) and a secure host subnet 908 (e.g., the secure host subnet 708 of FIG. 7). The VCN 906 can include an LPG 910 (e.g., the LPG 710 of FIG. 7) that can be communicatively coupled to an SSH VCN 912 (e.g., the SSH VCN 712 of FIG. 7) via an LPG 910 contained in the SSH VCN 912. The SSH VCN 912 can include an SSH subnet 914 (e.g., the SSH subnet 714 of FIG. 7), and the SSH VCN 912 can be communicatively coupled to a control plane VCN 916 (e.g., the control plane VCN 716 of FIG. 7) via an LPG 910 contained in the control plane VCN 916 and to a data plane VCN 918 (e.g., the data plane 718 of FIG. 7) via an LPG 910 contained in the data plane VCN 918. The control plane VCN 916 and the data plane VCN 918 can be contained in a service tenancy 919 (e.g., the service tenancy 719 of FIG. 7).

The control plane VCN 916 can include a control plane DMZ tier 920 (e.g., the control plane DMZ tier 720 of FIG. 7) that can include load balancer (LB) subnet(s) 922 (e.g., LB subnet(s) 722 of FIG. 7), a control plane app tier 924 (e.g., the control plane app tier 724 of FIG. 7) that can include app subnet(s) 926 (e.g., similar to app subnet(s) 726 of FIG. 7), a control plane data tier 928 (e.g., the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g., the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 7) and a network address translation (NAT) gateway 938 (e.g., the NAT gateway 738 of FIG. 7). The control plane VCN 916 can include the service gateway 936 and the NAT gateway 938.

The data plane VCN 918 can include a data plane app tier 946 (e.g., the data plane app tier 746 of FIG. 7), a data plane DMZ tier 948 (e.g., the data plane DMZ tier 748 of FIG. 7), and a data plane data tier 950 (e.g., the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g., public Internet 754 of FIG. 7).

The Internet gateway 934 contained in the control plane VCN 916 and contained in the data plane VCN 918 can be communicatively coupled to a metadata management service 952 (e.g., the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
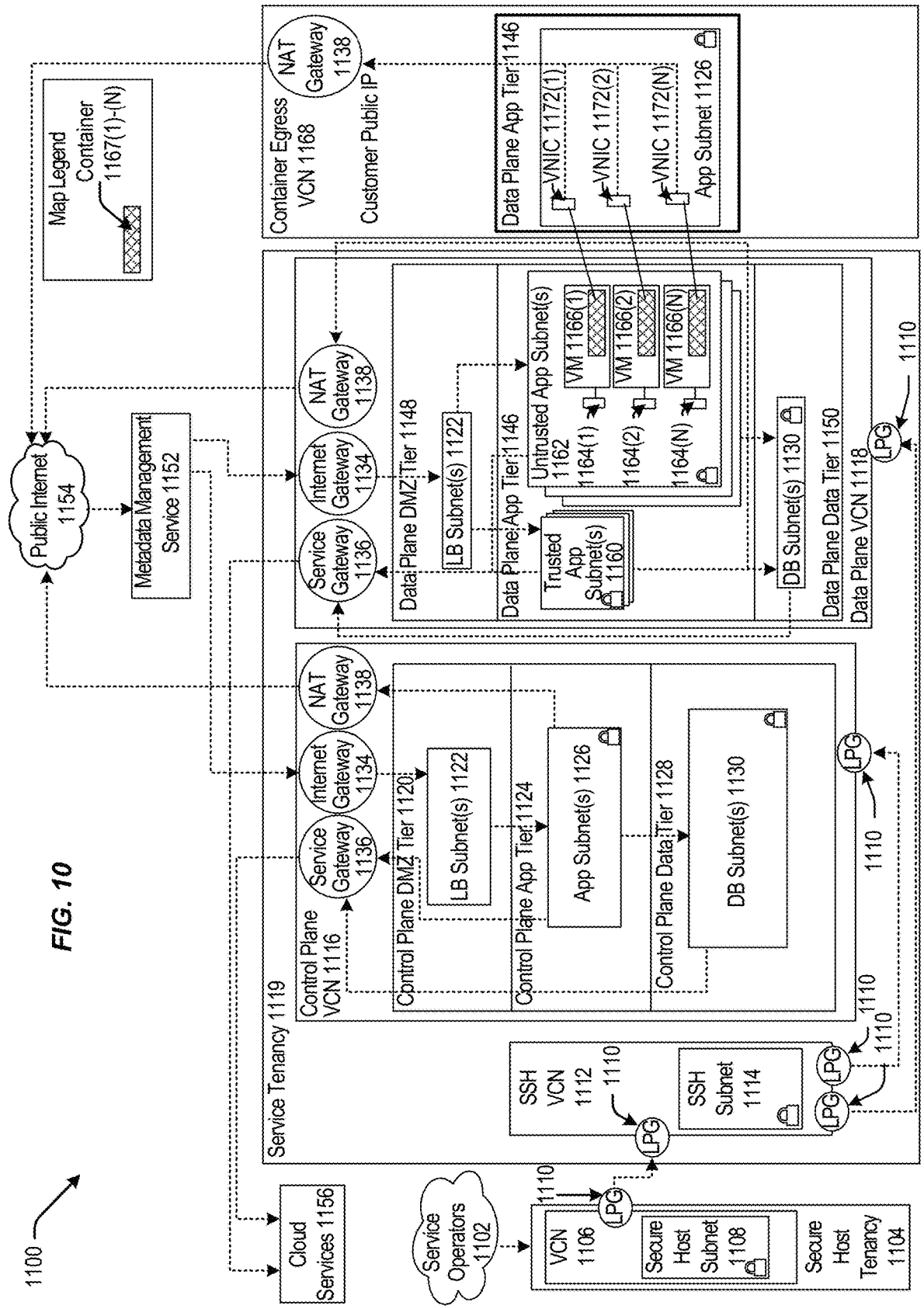
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 702 of FIG. 7) can be communicatively coupled to a secure host tenancy 1004 (e.g., the secure host tenancy 704 of FIG. 7) that can include a virtual cloud network (VCN) 1006 (e.g., the VCN 706 of FIG. 7) and a secure host subnet 1008 (e.g., the secure host subnet 708 of FIG. 7). The VCN 1006 can include an LPG 1010 (e.g., the LPG 710 of FIG. 7) that can be communicatively coupled to an SSH VCN 1012 (e.g., the SSH VCN 712 of FIG. 7) via an LPG 1010 contained in the SSH VCN 1012. The SSH VCN 1012 can include an SSH subnet 1014 (e.g., the SSH subnet 714 of FIG. 7), and the SSH VCN 1012 can be communicatively coupled to a control plane VCN 1016 (e.g., the control plane VCN 716 of FIG. 7) via an LPG 1010 contained in the control plane VCN 1016 and to a data plane VCN 1018 (e.g., the data plane 718 of FIG. 7) via an LPG 1010 contained in the data plane VCN 1018. The control plane VCN 1016 and the data plane VCN 1018 can be contained in a service tenancy 1019 (e.g., the service tenancy 719 of FIG. 7).

The control plane VCN 1016 can include a control plane DMZ tier 1020 (e.g., the control plane DMZ tier 720 of FIG. 7) that can include LB subnet(s) 1022 (e.g., LB subnet(s) 722 of FIG. 7), a control plane app tier 1024 (e.g., the control plane app tier 724 of FIG. 7) that can include app subnet(s) 1026 (e.g., app subnet(s) 726 of FIG. 7), a control plane data tier 1028 (e.g., the control plane data tier 728 of FIG. 7) that can include DB subnet(s) 1030 (e.g., DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 7) and a network address translation (NAT) gateway 1038 (e.g., the NAT gateway 738 of FIG. 7). The control plane VCN 1016 can include the service gateway 1036 and the NAT gateway 1038.

The data plane VCN 1018 can include a data plane app tier 1046 (e.g., the data plane app tier 746 of FIG. 7), a data plane DMZ tier 1048 (e.g., the data plane DMZ tier 748 of FIG. 7), and a data plane data tier 1050 (e.g., the data plane data tier 750 of FIG. 7). The data plane DMZ tier 1048 can include LB subnet(s) 1022 that can be communicatively coupled to trusted app subnet(s) 1060 (e.g., trusted app subnet(s) 960 of FIG. 9) and untrusted app subnet(s) 1062 (e.g., untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g., public Internet 754 of FIG. 7).

The Internet gateway 1034 contained in the control plane VCN 1016 and contained in the data plane VCN 1018 can be communicatively coupled to a metadata management service 1052 (e.g., the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
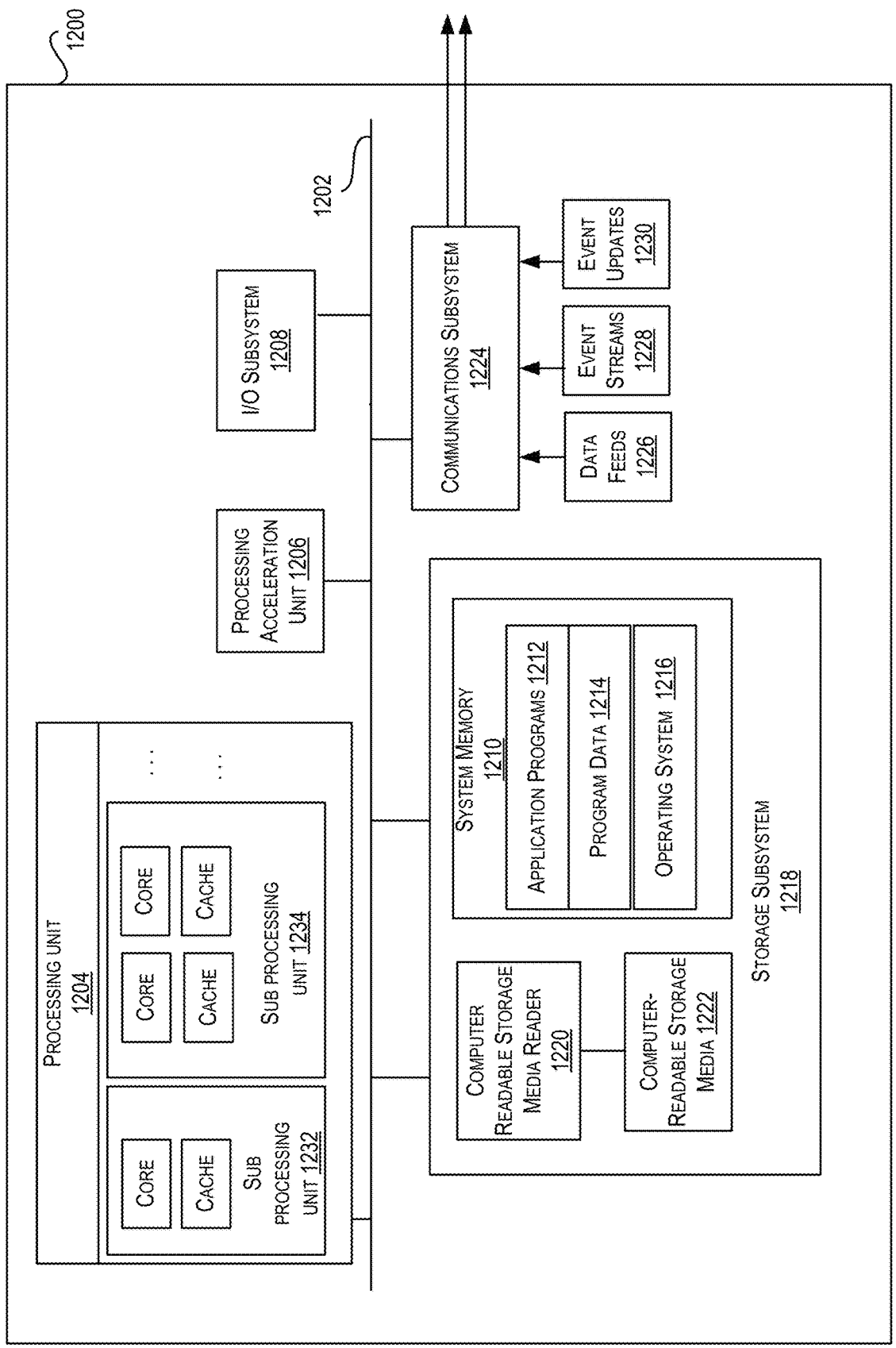
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1104 provide the functionality described above. Storage subsystem 1118 may also provide a repository for storing data used in accordance with the present disclosure.

As depicted in the example in FIG. 11, storage subsystem 1118 can include various components including a system memory 1110, computer-readable storage media 1122, and a computer readable storage media reader 1120. System memory 1110 may store program instructions that are loadable and executable by processing unit 1104. System memory 1110 may also store data that is used during the execution of the instructions and/or data that is generated during the execution of the program instructions. Various different kinds of programs may be loaded into system memory 1110 including but not limited to client applications, Web browsers, mid-tier applications, relational database management systems (RDBMS), virtual machines, containers, etc.

System memory 1110 may also store an operating system 1116. Examples of operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1100 executes one or more virtual machines, the virtual machines along with their guest operating systems (GOSs) may be loaded into system memory 1110 and executed by one or more processors or cores of processing unit 1104.

System memory 1110 can come in different configurations depending upon the type of computer system 1100. For example, system memory 1110 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1110 may include a basic input/output system (BIOS) containing basic routines that help to transfer information between elements within computer system 1100, such as during start-up.

Computer-readable storage media 1122 may represent remote, local, fixed, and/or removable storage devices plus storage media for temporarily and/or more permanently containing, storing, computer-readable information for use by computer system 1100 including instructions executable by processing unit 1104 of computer system 1100.

Computer-readable storage media 1122 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Machine-readable instructions executable by one or more processors or cores of processing unit 1104 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   receiving, by a computing system, a request for a big data query comprising one or more characteristics and one or more user parameters;
   accessing, by the computing system, a set of rules, the set of rules being based at least in part on respective properties of one or more big data query engines, and the set of rules correlating at least one of the one or more characteristics associated with the big data query and the one or more user parameters with the respective properties of the one or more big data query engines;
   determining, by the computing system, a candidate list of big data query engines comprising a subset of the one or more big data query engines, the candidate list determined based at least in part on the set of rules;
   generating, by the computing system and using a machine learning model respective probability scores for each big data query engine of candidate list of big data query engines, the respective probability scores representing a likelihood of the big data query being successfully completed by each big data query engine of the subset;
   selecting, by the computing system, a particular big data query engine of the one or more big data query engines of the candidate list, based at least in part on the respective probability score of the particular big data query engine;
   executing, by the computing system, the big data query using the particular big data query engine;
   identifying, by the computing system, a trigger indicating a performance issue with the particular big data query engine; and
   switching, by the computing system, the execution the big data query to a second big data query engine of the candidate list of big data query engines.

2. The method of claim 1, wherein identifying the trigger indicating a performance issue further comprises:
   monitoring, by the computing system, one or more performance metrics of the particular big data query engine during the execution of the big data query;
   determining, by the computing system, that the particular big data query engine is not performing to an expected level based at least in part on the one or more performance metrics and the one or more user parameters;
   in response to determining that the particular big data query engine is not performing to the expected level:
     terminating, by the computing system, the execution of the big data query by the particular big data query engine; and
     executing, by the computing system, the big data query using the second big data query engine, the second big data query engine selected based at least in part on the respective probability score of the second big data query engine.

3. The method of claim 1, further comprising:
   determining, by the computing system, one or more performance metrics of the particular big data query engine during the execution of the big data query; and retraining, by the computing system, the machine learning model using the one or more the one or more performance metrics and at least one of the one or more characteristics of the big data query and the one or more user parameters.

4. The method of claim 3, wherein the machine learning model is retrained after a specific number of query executions.

5. The method of claim 1, wherein the one or more user parameters comprise at least one of a reliability parameter, a latency parameter, and an accuracy parameter.

6. The method of claim 1, wherein the one or more characteristics of the big data query include a number of partitions, a row count, a query-type, and a table size.

7. The method of claim 1, wherein the machine learning model is trained using a training data set comprising a data set size, a row count, a number of partitions, a column count, a column type map, a number of files, a query-operator count map, a query result reliability weight, a query execution time, and a query execution time weight.

8. The method of claim 1, wherein determining the candidate list is based at least in part on a relational tree comprising the one or more characteristics associated with the big data query and the one or more user parameters.

9. A computing system, comprising:
one or more processors; and
a computer readable memory comprising instructions that, when executed by the one or more processors, cause the computing system to perform operations to:
receive, by the computing system, a request for a big data query comprising one or more characteristics and one or more user parameters;
access, by the computing system, a set of rules, the set of rules being based at least in part on respective properties of one or more big data query engines, and the set of rules correlating at least one of the one or more characteristics associated with the big data query and the one or more user parameters with the respective properties of the one or more big data query engines;
determine, by the computing system, a candidate list of big data query engines comprising a subset of the one or more big data query engines, the candidate list determined based at least in part on the set of rules;
generate, by the computing system and using a machine learning model respective probability scores for each big data query engine of candidate list of big data query engines, the respective probability scores representing a likelihood of the big data query being successfully completed by each big data query engine of the subset;
select, by the computing system, a particular big data query engine of the one or more big data query engines of the candidate list, based at least in part on the respective probability score of the particular big data query engine;
execute, by the computing system, the big data query using the particular big data query engine;
identify, by the computing system, a trigger indicating a performance issue with the particular big data query engine; and
switch, by the computing system, the execution the big data query to a second big data query engine of the candidate list of big data query engines.

10. The computing system of claim 9, wherein the operations further cause the computing system to:

monitor, by the computing system, one or more performance metrics of the particular big data query engine during the execution of the big data query;
determine, by the computing system, that the particular big data query engine is not performing to an expected level based at least in part on the one or more performance metrics and the one or more user parameters;
in response to determining that the particular big data query engine is not performing to the expected level:
terminate, by the computing system, the execution of the big data query by the particular big data query engine; and
execute, by the computing system, the big data query using the second big data query engine, the second big data query engine selected based at least in part on the respective probability score of the second big data query engine.

11. The computing system of claim 9, wherein the computing system is implemented to select a query engine in a Hadoop environment.

12. The computing system of claim 9, wherein the machine learning model is trained using a training data set comprising a data set size, a row count, a number of partitions, a column count, a column type map, a number of files, a query-operator count map, a query result reliability weight, a query execution time, and a query execution time weight.

13. The computing system of claim 9, wherein the one or more user parameters comprise at least one of a reliability parameter, a latency parameter, and an accuracy parameter.

14. The computing system of claim 9, wherein the one or more characteristics of the big data query include a number of partitions, a row count, a query-type, and a table size.

15. A non-transitory computer-readable medium comprising instructions that, when executed by a processor, cause the processor to perform operations comprising:
receiving, by a computing system, a request for a big data query comprising one or more characteristics and one or more user parameters;
accessing, by the computing system, a set of rules, the set of rules being based at least in part on respective properties of one or more big data query engines, and the set of rules correlating at least one of the one or more characteristics associated with the big data query and the one or more user parameters with the respective properties of the one or more big data query engines;
determining, by the computing system, a candidate list of big data query engines comprising a subset of the one or more big data query engines, the candidate list determined based at least in part on the set of rules;
generating, by the computing system and using a machine learning model, respective probability scores for each big data query engine of candidate list of big data query engines, the respective probability scores representing a likelihood of the big data query being successfully completed by each big data query engine of the subset;
selecting, by the computing system, a particular big data query engine of the one or more big data query engines of the candidate list, based at least in part on the respective probability score of the particular big data query engine; and
executing, by the computing system, the big data query using the particular big data query engine;
identifying, by the computing system, a trigger indicating a performance issue with the particular big data query engine; and switching, by the computing system, the execution the big data query to a second big data query engine of the candidate list of big data query engines.

16. The non-transitory computer-readable medium of claim 15, wherein identifying the trigger indicating a performance issue further comprises:
   monitoring, by the computing system, one or more performance metrics of the particular big data query engine during the execution of the big data query;
   determining, by the computing system, that the particular big data query engine is not performing to an expected level based at least in part on the one or more performance metrics and the one or more user parameters;
   in response to determining that the particular big data query engine is not performing to the expected level:
      terminating, by the computing system, the execution of the big data query by the particular big data query engine; and
      executing, by the computing system, the big data query using the second big data query engine, the second big data query engine selected based at least in part on the respective probability score of the second big data query engine.

17. The non-transitory computer-readable medium of claim 15, further comprising:
   determining, by the computing system, one or more performance metrics of the particular big data query engine during the execution of the big data query; and
   retraining, by the computing system, the machine learning model using the one or more the one or more performance metrics and at least one of the one or more characteristics of the big data query and the one or more user parameters.

18. The non-transitory computer-readable medium of claim 17, wherein the machine learning model is retrained after a specific number of query executions.

19. The non-transitory computer-readable medium of claim 15, wherein the one or more user parameters comprise at least one of a reliability parameter, a latency parameter, and an accuracy parameter.

20. The non-transitory computer-readable medium of claim 15, wherein the one or more characteristics of the big data query include a number of partitions, a row count, a query-type, and a table size.

* * * * *

UNITED STATES PATENT AND TRADEMARK OFFICE
CERTIFICATE OF CORRECTION

PATENT NO. : 12,117,980 B1
APPLICATION NO. : 18/244461
DATED : October 15, 2024
INVENTOR(S) : Chacko et al.

It is certified that error appears in the above-identified patent and that said Letters Patent is hereby corrected as shown below:

In the Specification

In Column 1, Line 51, delete "the big" and insert -- of the big --, therefor.

In Column 2, Line 9, delete "the one or more the one or more" and insert -- the one or more --, therefor.

In Column 4, Line 9, delete "the one or more the one or more" and insert -- the one or more --, therefor.

In the Claims

In Column 30, Line 42, in Claim 1, delete "execution the" and insert -- execution of the --, therefor.

In Column 31, Line 2, in Claim 3, delete "the one or more the one or more" and insert -- the one or more --, therefor.

In Column 34, Line 7, in Claim 17, delete "the one or more the one or more" and insert -- the one or more --, therefor.

Signed and Sealed this
Twenty-eighth Day of January, 2025

Coke Morgan Stewart
*Acting Director of the United States Patent and Trademark Office*